US008804180B2

(12) United States Patent
Kawanago

(10) Patent No.: US 8,804,180 B2
(45) Date of Patent: Aug. 12, 2014

(54) IMAGE FORMING APPARATUS

(71) Applicant: Konica Minolta, Inc., Tokyo (JP)

(72) Inventor: Yusuke Kawanago, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 13/955,055

(22) Filed: Jul. 31, 2013

(65) Prior Publication Data

US 2014/0050494 A1 Feb. 20, 2014

(30) Foreign Application Priority Data

Aug. 17, 2012 (JP) ................................ 2012-180915

(51) Int. Cl.
*G06F 15/00* (2006.01)

(52) U.S. Cl.
USPC ........................................................ 358/1.15

(58) Field of Classification Search
USPC ........................................................ 358/1.15
See application file for complete search history.

(56) References Cited

U.S. PATENT DOCUMENTS

2010/0028034 A1* 2/2010 Aiko ............................... 399/66

FOREIGN PATENT DOCUMENTS

JP 2007-022680 A 2/2007

* cited by examiner

*Primary Examiner* — Saeid Ebrahimi Dehkordy
(74) *Attorney, Agent, or Firm* — Lucas & Mercanti, LLP

(57) ABSTRACT

In an image forming apparatus, a first deviation detection portion detects an amount of deviation of a sheet of paper in relation to a reference position of an edge of the sheet of paper. A control portion determines whether or not an amount of deviation detected by the first deviation detection portion exists within a moving adjustment range of a pair of registration rollers in the second control and performs a first control to correct the reference position of the edge of the sheet of gaper before the image is formed when the amount of deviation exceeds the moving adjustment range of the pair of registration rollers. A second deviation detection portion detects an amount of deviation of the sheet of paper just before the image is formed in relation to a reference position of the edge of the corrected sheet of paper.

8 Claims, 9 Drawing Sheets

IMAGE FORMING APPARATUS

CROSS REFERENCE TO RELATED APPLICATION

The present invention contains subject matter related to Japanese Patent Application No. JP 2012-180915 filed in the Japanese Patent Office on Aug. 17, 2012, the entire contents of which being incorporated herein by reference.

BACKGROUND OF THE INVENTION

1. Field of the Invention

The present invention relates to an image forming apparatus which is preferably applied to a mono chrome printer, a color printer, a copier, a multi-function printer or the like.

2. Description of Related Art

In recent years, the image forming apparatus has included a deviation detection system at a position that, has been away from an image forming portion by a predetermined distance. The image forming apparatus has detected any deviation of a sheet of paper at this position and has had a deviation correction function (hereinafter, referred to as a "first control") to correct the deviation of the sheet of paper by shifting an image writing position in an exposing portion along a direction which is perpendicular to a sheet-transporting direction based on a detected, amount of deviation of the sheet of paper.

Further, the image forming apparatus has included another deviation detection system having a predetermined detection expent and a moving portion containing a pair of registration rollers. This image forming apparatus has had a deviation correction function (hereinafter, referred to at a "second control") to correct the deviation of the sheet of paper by detecting a deviation of the sheet of paper by the deviation detection system before the image has been formed and moving the sheet of paper along a direction which is perpendicular to a sheet-transporting direction based on a detected amount of deviation of the sheet of paper with the pair of the registration rollers nipping the sheet of paper (see Japanese Patent Application Publication No. 2007-022680).

SUMMARY OF THE INVENTION

In the image forming apparatus having the deviation correction function of the sheet of paper like Japanese Patent Application Publication No. 2007-022680, a moving portion of the sheet of paper has a limit of a moving amount of the pair of registration rollers. When a sheet of paper deviated over the limit of the moving amount of the pair of registration rollers reaches the deviation detection portion thereof, it is difficult for the linage forming apparatus to show the deviation correction function with the pair of registration rollers nipping the sheet of paper.

Further, in the limit forming apparatus of Japanese Patent Application Publication No. 2007-022680, a deviation detection portion and a moving portion are provided near an image forming portion in order to carry out the second control. The image forming apparatus, however, may perform a method of correcting an image writing position in the exposing portion each time an amount of deviation of the sheet of paper is detected by utilising functions in the deviation detection portion during the second control performing time. In this moment, since the deviation detection portion and the moving portion are provided too near the image forming portion, it is too short to perform image processing so that it is difficult to concern an image writing position in the exposing portion. This may cause any variations in a moving amount of the sheet of paper before the image is formed or any variations in a moving amount of the image formed sheet of paper along a sheet-width direction during sheet ejection.

This invention addresses the above-mentioned issues and has an object to provide an improved image forming apparatus which restraints a moving amount of the pair of registration rollers so as to be limited to a moving adjustment range that is a limit of the pair of registration rollers and restrains any variations in the moving amount of the sheet of paper before the image is formed or any variations in the moving amount of the linage formed sheet of paper along the sheet-width direction during the sheet ejection.

To achieve the above-mentioned object, an image forming apparatus for forming an image on a sheet of paper contains a first deviation detection portion that detects a first amount of deviation of the sheet of paper in relation to a reference position of an edge of the sheet of paper, a pair of registration rollers that transport the sheet of paper, the pair of registration rollers being positioned at a downstream side of the first deviation detection portion, a second deviation detection portion that detects a second amount of deviation of the sheet of paper in relation to the reference position of the edge of the sheet of paper, the second deviation detection portion being positioned at the downstream side of the pair of registration rollers, an image forming portion that receives the sheet of paper transported, by the pair of registration rollers to form the image, and includes an exposing portion for writing the image, the image forming portion being positioned at the downstream side of the second deviation detection portion, and a control portion that is configured to perform, a first control to correct an image writing position in the exposing portion based on the first amount of deviation of the sheet of paper along a direction that is perpendicular to a transporting direction of the sheet of paper and is configured to perform a second control to move the pair of the registration rollers with them nipping the sheet of paper based on the second amount of deviation, of the sheet of paper along the direction that is perpendicular to the transporting direction of the sheet of paper, wherein the control portion determines, whether or not the first amount of deviation of the sheet of paper exists within the moving adjustment range of the pair of registration rollers in the second control, the control portion performs the first control to correct the reference position of the edge of the sheet of paper to be detected by the second deviation detection portion when the first amount of deviation of the sheet of paper exceeds the moving adjustment range of the pair of registration rollers, the control portion controls the second deviation detection portion to detect the second amount of deviation or the sheet of paper in relation to the reference position corrected by the first control, and the control portion performs the second control to move the pair of registration rollers based on the detected second amount of deviation of the sheet of paper.

It is desirable to provide the image forming apparatus wherein the control portion performs the first control, when the first amount of deviation of the sheet of paper exceeds the moving adjustment range of the pair or registration rollers in the second control, to shift the image writing position corresponding to the first amount of deviation by an amount exceeded from the moving adjustment range to correct the reference position.

It is also desirable to provide the image forming apparatus wherein the control portion performs the first control to shift the image writing position along the direction that is perpendicular to the transporting direction of the sheet of paper based on the first amount of deviation to correct the reference position so that an amount of movement of the pair of registration rollers in the second control exists within the moving adjustment range thereof.

It is still desirable to provide the image forming apparatus wherein the control portion compares a maximum value of movement of the pair of registration rollers in the moving adjustment range thereof in the second control with a writing maximum value of the writing position in a writing adjustment range thereof in the first control, the control portion is configured to shift the image writing position corresponding to the first amount of deviation along the direction that is perpendicular to the transporting direction of the sheet of paper to correct the reference position when the first amount of deviation is the writing maximum value or less, the control portion determines whether or not the first amount of deviation is a sum of the maximum value of movement and the writing maximum value or less, and the control portion is configured to shift the image writing position corresponding to the writing maximum value along the direction that is perpendicular to the transporting direction of the sheet of paper to correct the reference position when the first amount of deviation is the sum of the maximum value of movement and the writing maximum value or less.

It is further desirable to provide the image forming apparatus wherein the control portion is configured to calculate a difference between the first amount of deviation which is obtained by the first deviation detection portion and the maximum value of movement of the pair of registration rollers in the second control to obtain a first difference, the control portion compares the obtained first difference with the writing maximum value of the writing position in the writing adjustment range thereof in the first control, and the control portion is configured to shift the image writing position corresponding to the first difference along the direction that is perpendicular to the transporting direction of the sheet of paper to correct the reference position when the first difference is the writing maximum value or less.

It is additionally desirable to provide the image forming apparatus wherein the control portion is configured to calculate a difference between the first amount of deviation and the writing maximum value of the image writing position in the writing adjustment region in the first control to obtain a second difference, the control portion compares the obtained second difference with the maximum value of movement of the pair of registration rollers in the moving adjustment range thereof in the second control, and the control portion, is configured to shift the image writing position corresponding to the writing maximum value along the direction that is perpendicular to the transporting direction of the sheet of paper to correct the reference position when the second difference is the maximum value of movement or less.

It is still further desirable to provide the image forming apparatus wherein the control portion performs the first control before the image is formed, when the first amount of deviation of the sheet does not exceed the writing adjustment range of the image writing position, to shift the image writing position corresponding to the first amount of deviation along the direction that is perpendicular to the transporting direction of the sheet of paper and to correct the reference position.

It is still additionally desirable to provide the image forming apparatus.

The concluding portion of this specification particularly points out and directly claims the subject matter of the present invention. However, those skilled in the art will best understand both the organization and method of operation of the invention, together with further advantages and objects thereof, by reading tire remaining portions of the specification in view of the accompanying drawing(s) wherein like reference characters refer to like elements.

DESCRIPTION OF THE PREFERRED EMBODIMENTS

The following will describe a preferred embodiment of a color copier, which is an image forming apparatus relating to the invention, with reference to drawings. It is to be noted that the description in following embodiments is exemplified and any technical scope of the claims and/or meaning of term(s) claimed in the claims are not limited thereto.

Figure 1:
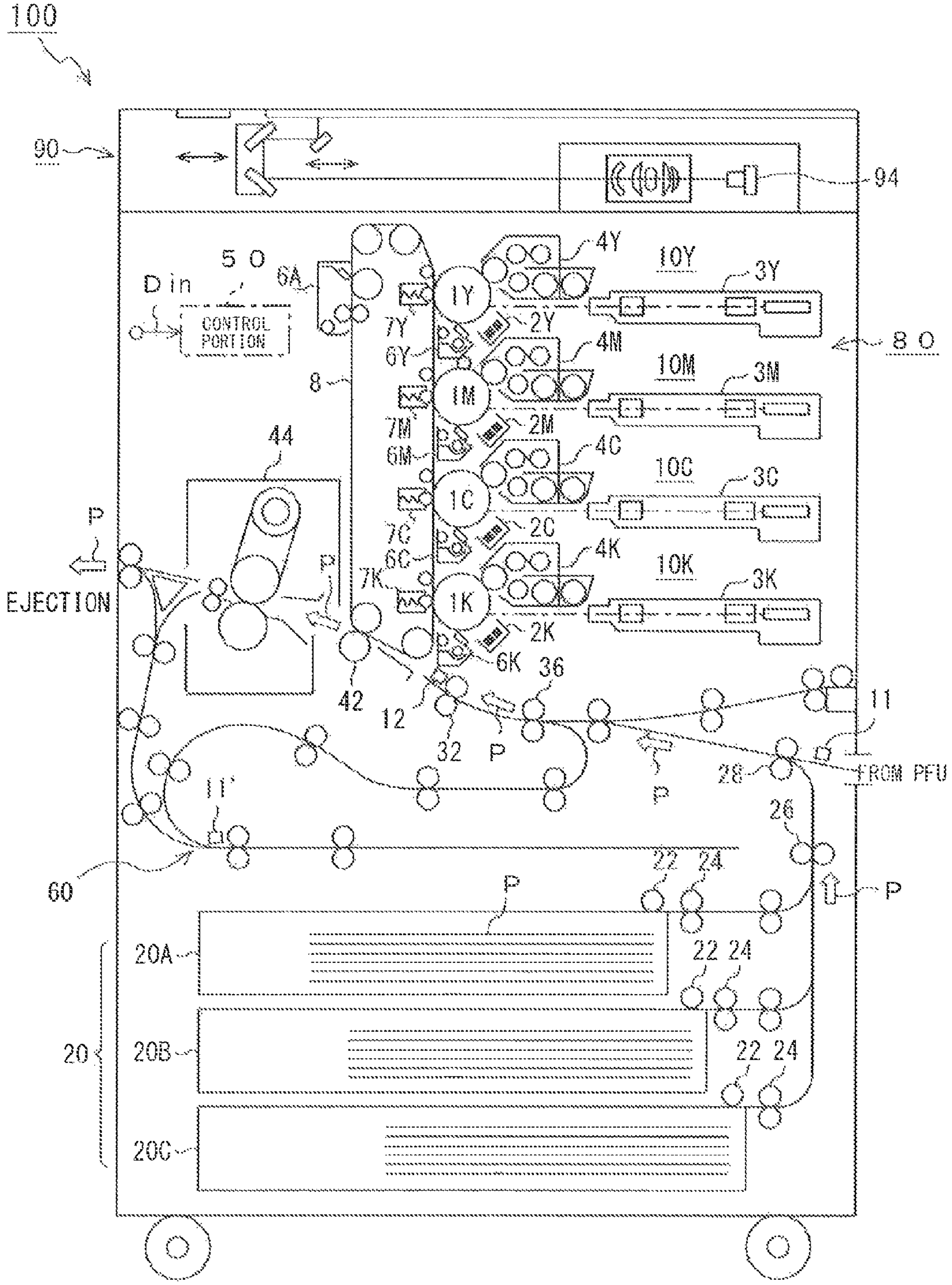
FIG. 1 is a sectional diagram of a color copier which is an image forming apparatus according to an embodiment of this invention showing a configuration example thereof.

As shown in FIG. 1, the color copier 100 is an examination of the image forming apparatus and has a function to correct any deviation of the sheet of paper P. The color copier 100 forms an image on a predetermined sheet of paper P. The image forming apparatus according to the invention is not limited to the color copier 100 and is applicable to a monochrome printer, a color printer or a multi-function printer.

The color copier 100 has two functions (hereinafter, referred to as first and second controls) for correcting any deviations of sheet of paper P. Here, the first control is referred to as a control for shifting an image writing position by art exposing portion before the image is formed along a direction that is perpendicular to a transporting direction of a sheet of paper based on a first amount of deviation of the sheet of paper P in response to a reference position of an edge of the sheet of paper. The second control is referred to as a control for moving a pair of registration rollers with them nipping the sheet of paper P just before the image is formed along a direction that is perpendicular to a sheet-transporting direction based on a second amount of deviation of the sheet of paper P.

The color copier 100 is provided with a feeder 20, a fixing portion 44, a control portion 50, an image forming portion 80 of electrophotographic system, an image reading portion 90 and an automatic document feeding portion, not shown. Description of such an automatic document feeding portion will be omitted for convenience.

The image reading portion 90 irradiates light from a source of light onto the documents or the like conveyed from the automatic document feeding portion one by one and receives reflected light using a charge-couple device (CCD) image sensor 94 to obtain image data of the documents or the like. The image processing portion, not shown, performs various kinds of processing such as analog processing, analog/digital (A/D) conversion, compression and the like on the image data obtained by the image reading portion 90.

The control portion 50 receives image data Din of RGB system from the image processing portion or the like. The control portion 50 then performs a color conversion on the image data Din to form image data Dy, Dm, Dc and Dk of YMCK system. The image forming portion 80 forms a monochrome image or a color image on the sheet of paper P at an image forming position thereof. The image forming portion 80, for example, forms a color toner image based on items of color-converted image data for yellow (Y) color, magenta (M) color cyan (C) color and black (BK) color.

The image forming portion 80 is provided with image forming unit 10Y which forms a yellow (Y) image, an image forming unit 10M which forms a magenta (M) image, an image forming unit 10C which forms a cyan (C) image and an image forming unit 10K which forms a black (BK) image. In this embodiment, the following will describe the members having the common color function or name with attaching Y, M, C and K thereto.

The charging portions 2Y, 2M, 2C and 2K corresponding to respective image colors uniformly charge surfaces of the photosensitive drums 1Y, 1M, 1C and 1K. The exposing portions 3Y, 3M, 3C and 3K each wring the image form electrostatic latent images on the photosensitive drums 1Y, 1M, 1C and 1K using a polygon mirror or the like based on the image data. The developing portions 4Y, 4M, 4C and 4K corresponding to respective colors develop the electrostatic latent images. Such charge, exposure and development enable the electrostatic latent images formed on the photosensitive drums 1Y, 1M, 1C and 1K to be transferred on an intermediate transfer belt 8 (primary transfer) by the operations of primary transfer rollers 7Y, 7M, 7C and 7K corresponding to the photosensitive drums 1Y, 1M, 1C and 1K. Respective electrostatic latent images are transferred on the intermediate transfer belt 8 and placed one another so that a color toner image can be formed.

Secondary transfer portion 42 transfers the placed color toner images on the sheet of paper P. The feeder 20 feeds the sheet of paper P from a feeding tray 20A, 20B or 20C or the like and the sheet of paper P is conveyed to the secondary transfer portion 42. Each feeding tray 20A, 20B or 20C contains sheets of paper P of a predetermined size. Each feeding tray 20A, 20B or 20C is provided with pick-up rollers 22 for feeding the sheet of paper P frost each of the feeding trays and candling rollers 24 for preventing a multiple of sheets of paper P from being sent from each feeding tray.

In this embodiment, a paper feed unit (PFU) for feeding the sheet of paper P may be attached to the color copier 100 in addition to the feeder 20. A first deviation detection portion 1 is positioned on a sheet-transporting route of the sheet of paper P fed from this PFU. The first deviation detection portion 11 is arranged at an upstream side of the image forming position in the image forming portion 80 along the sheet-transporting direction of the sheet of paper P and at the upstream side of the transfer rollers 28. The first deviation detection portion 11 may be arranged at PFU side. The first deviation detection portion 11 detects a first amount of deviation $\Delta X_1$ of the sheet of paper f in relation no a reference position Ps of an edge of the sheet of paper P (hereinafter, the first amount of deviation of the sheet of paper P detected by the first deviation detection portion 11 will be referred to as $\Delta X_1$).

A pair of registration rollers 32, loop rollers 36 and the like are arranged on the sheet-transporting route between the above-mentioned image forming portion 80 and the transfer rollers 28. The pair of registration rollers 32 is positioned at a downstream side of the first deviation detection portion 11 and transports the sheet of paper P to the image forming portion 80. The pair of registration rollers 32 has a configuration so that its position can be moved along the direction that is perpendicular to the sheet-transporting direction of the sheet of paper P with them nipping the sheet of paper P by the moving portion 40 shown in FIG. 4. The second deviation detection portion 12 is positioned at a just upstream side of the image totaling portion 80 and a downstream side of the pair of registration rollers 32 on a sheet-transporting route of the sheet of paper P. The second deviation detection portion 12 detects a second amount of deviation $\Delta X_2$ of the sheet of paper P just before the image is formed in relation to a reference position of an edge of the sheet of paper P (hereinafter, the second amount of deviation of the sheet of paper P detected by the second deviation detection portion 12 will be referred to as $\Delta X_2$).

The color copier 100 also has a duplex printing mode and is provided with a sheet-reversing unit 60 to be used for the duplex printing mode. The sheet-reversing unit 60 is arranged above the feeding tray 20A. The sheet-reversing unit 60 automatically reverses the sheet of paper P, on a surface of which the image has been formed, during the duplex printing. The sheet-reversing unit 60 is provided with a first deviation detection portion 11'. The first deviation detection portion 11' is arranged on, for example, a sheet-reversing route of the sheet-reversing on it 60.

The above-mentioned feeder 20 feeds the sheet or paper P from the feeding tray selected on the manipulation/display portion 48 (see FIG. 4) or the like using the pick-up rollers 22 and the like. The feeder 20 feeds the fed sheet or paper P to the pair of registration rollers 32 via the conveying rollers 26, the transfer rollers 28 and the like. The loop rollers 36 correct a deflection of the sheet or paper P fed to the pair of registration rollers 32 by hitting a forward edge of the sheet of paper P thereto (Registration Correction).

When finishing the registration correction, the pair of registration rollers 32 corrects the deviation of the sheet of paper P. For example, the moving portion 40 shown in FIG. 4 moves the pair of registration rollers 32 along the direction that is perpendicular to the sheet-transporting direction of the sheet of paper P based on the second amount of deviation of the sheet of paper P. When finishing the deviation correction of the sheet of paper P, the pair of registration rollers 32 conveys the sheet of paper P to the secondary transfer rollers 42 at a predetermined timing. The secondary transfer rollers 42 transfer the color toner image supported by the intermediate transfer belt 8 on the sheet of paper P.

The fixing portion 44 fixes line color toner image transferred on the sheet of paper P. The fixing portion 44 contains a pressure roller, a heating roller, not shown. The fixing portion 44 fixes Line color toner image transferred on the sheet of paper P by applying pressure and heat to the sheet of paper P via the pressure roller and the heating roller. This enables the color toner image based on the image data Din to be formed on the desired sheet of paper P.

It is to be noted that cleaning portions 6Y, 6M, 6C and 6K corresponding to the photosensitive drums 1Y, 1M, 1C and 1K for Y, M, and K colors are provided at left, lower portions of the above-mentioned respective photosensitive drums 1Y, 1M, 1C and 1K. The cleaning portions 6Y, 6M, 6C and 6K remove any toners, which remain on the photosensitive drums 1Y, 1M, 1C and 1K at former image forming time, from the photosensitive drums 1Y, 1M, 1C and 1K and clean them. A cleaning portion 6A is provided at a left upper portion of the intermediate transfer belt 8. The cleaning portion 6A cleans any toners, which remain on the intermediate transfer belt 8 after the secondary transfer.

When setting the duplex printing mode, the sheet or paper P, on the surface of which the image has been formed, is conveyed from the fixing portion 44 to the sheet-reversing unit 60. The sheet-reversing unit 60 automatically reverses the sheet of paper P. The pair of registration rollers 32 again feeds the reversed sheet of paper P to the image forming portion 80. In this moment, the first deviation detection portion 11' arranged on the sheet-reversing route in the sheet-reversing unit 60 detects the first amount of deviation $\Delta X_1$ of the sheet of paper P. Thus, the color copier 100 is configured.

Figure 2:
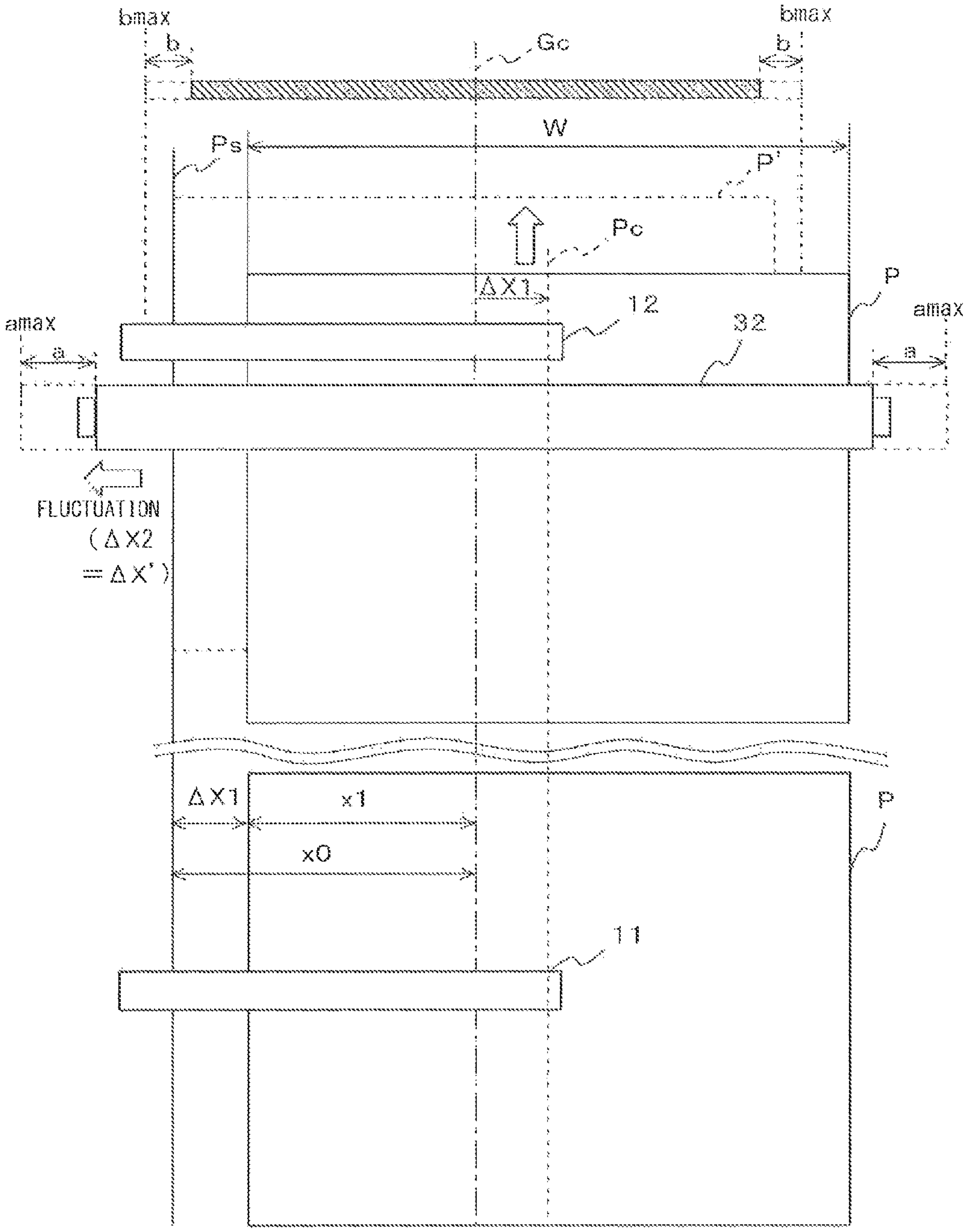
FIG. 2 is a diagram showing a detection example (Part one) of a sheet of paper P when correcting a deviation of a sheet of paper.
Figure 3:
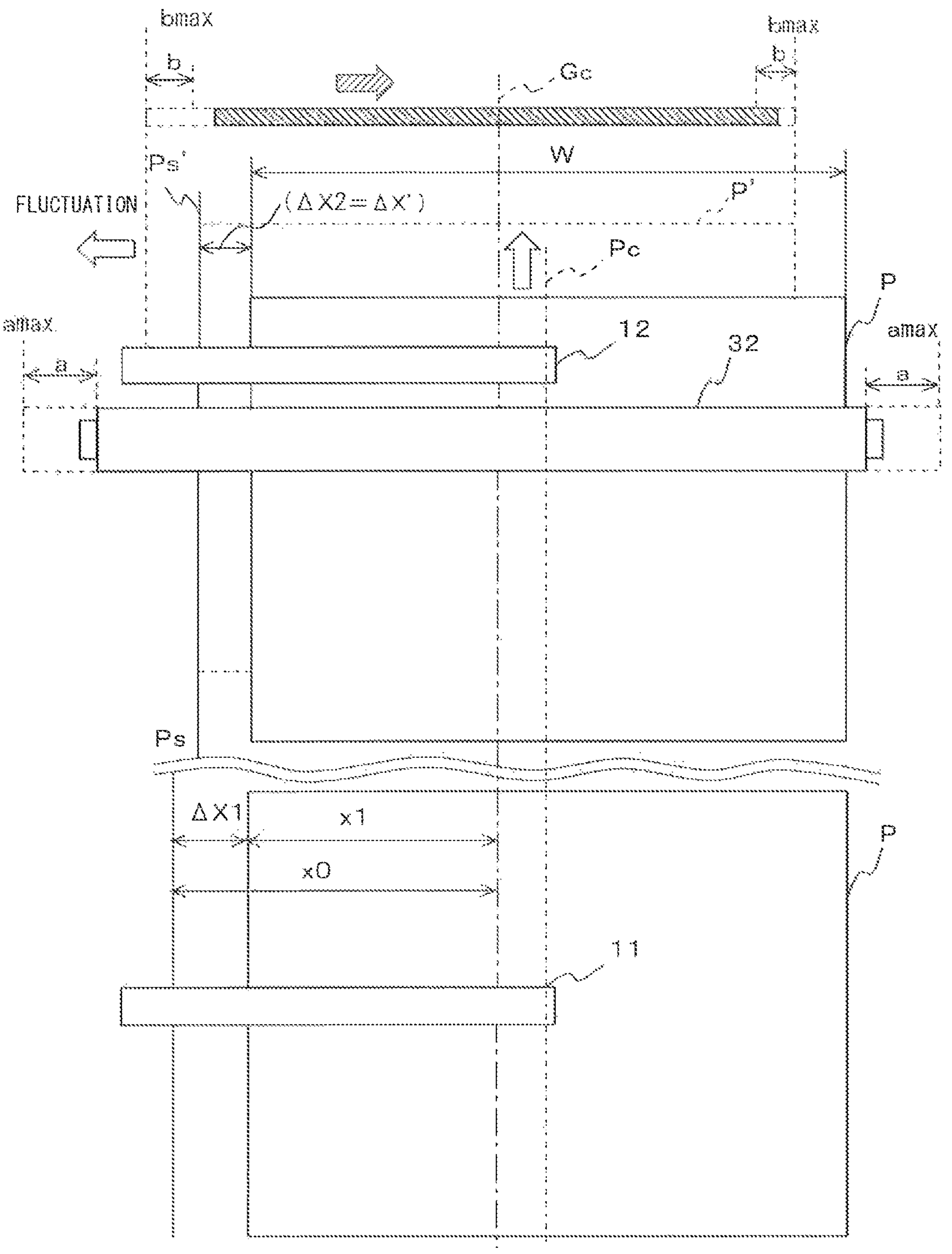
FIG. 3 is a diagram showing a detection example (Part two) of the sheen of paper P when correcting the sheet of paper.

The following will describe a detection example of the sheet of paper P when correcting the deviation of the sheet of paper P with reference to FIGS. 2 and 3.

According to the detection example of the sheet of paper P when correcting the deviation of the sheet of paper P as shown in FIG. 2, a size W of the sheet of paper is first fixed so that a reference position Ps of the edge of the sheet of paper P is fixed. This is a case where the sheet of paper P is deviated from the reference position Ps to a right side by the first amount of deviation $\Delta X_1$. The first and second deviation detection portions 11 and 12 detect the first, and second amounts of deviation $\Delta X_1$ and a $\Delta X_2$. A center line of the image (hereinafter, referred to as an "image center Gc") is shown in FIG. 2 by an alternate long and short dash line. In this embodiment, the image is formed on the sheet of paper P based on the image center Gc. A center line of the sheet of paper (hereinafter, referred to as a "sheet center Pc") is shown in FIG. 2 by a dotted line.

Term, "x0" shown in FIG. 2 is a reference length of the edge of the sheet of paper P and is a length from the image center Gc to the reference position Ps of the edge of the sheet of paper P. Term, "x1" shown in FIG. 2 is a passing distance of the edge of the sheet of paper P, which is a length from the image enter Gc to the passing position of the edge of the sheet of paper P. The first amount of deviation $\Delta X_1$ is obtained by calculating a difference between the reference length x0 of the edge of the sheet of paper P and the pas-sing distance x1 of the edge of the sheet of paper P. The second amount of deviation $\Delta X_2$ becomes a required amount of movement $\Delta X_2$ when correcting the deviation of the sheet of paper P. When the sheet of paper P is not deviated to the right side and the reference position Ps of the edge of the sheet of paper P matches the passing position of the edge of the sheet of paper P, the sheet of paper is passed like the sheet of paper P' shown in FIG. 2 by the dotted line.

In this example, movable regions, which are indicated in FIG. 2 by the dotted line, are provided on the both sides of the pair of registration rollers along a main scanning direction of the pair of registration rollers. The main scanning direction is also the direction (also moving direction of the pair of registration rollers 32) that is perpendicular to the sheet-transporting direction of the sheet of paper P. A region from an edge portion of the pair of registration rollers 32 to an edge portion ("a max"=maximum value of the movement) of the movable region is a movement adjustment region (hereinafter, also referred to as "moving adjustment width "a") of the pair of registration rollers 32. The maximum value of the movement, a max, is the maximum value of the moving adjustment width "a". The moving adjustment widths "a", "a" are provided on both sides of the pair of registration rollers 32 so as to have the same width as each other when a driving center position of the pair of registration rollers 32 meets the image center Gc.

The image writing region by the exposing portion 3Y and the like along the main scanning direction is shown in FIG. 2 by slant lines. In this embodiment, auxiliary image writing regions shown in FIG. 2 by the dotted line are provided on both sides of the image writing region, a region from an edge portion of the image writing region to an edge portion ("b max"=writing maximum value) or the auxiliary image writing region is a writing adjustment region (hereinafter, also referred to as "writing adjustment width "b") of the image writing position by the exposing portion. The writing maximum value, b max, is the maximum value of the writing adjustment width "b". The writing adjustment widths "b", "b" are provided on both sides of the image writing region so as to have the same width as each other (to have the same pixel number).

In this embodiment, the first deviation detection portion 11 detects the first amount of deviation $\Delta X_1$ or the sheet of paper P. The control portion 50 performs the first control to correct the reference position Ps of the edge of the sheet of paper P to the reference position Ps' thereof, which is to be detected by the second deviation detection portion 12, before the image is formed when the first amount of deviation $\Delta X_1$ of the sheet of paper P exceeds the moving adjustment range of the pair of registration rollers 32 in the second control. The control portion 50 then controls the second deviation detection portion 12 to detect the second amount of deviation $\Delta X_2$ or the sheet of paper P in relation to the reference position Ps', which has been corrected in the first control, of the edge of the sheet of paper P. The control portion 50 also performs the second control to move the pair of registration rollers 32 based on the detected second amount of deviation $\Delta X_2$ of the sheet of paper P.

The deviation detection example of the sheet of paper P when correcting the deviation of the sheet of gaper P as shown in FIG. 3 is an example in which the reference position Ps of the edge of sheet of paper P shifts to the reference position Ps' of the edge of sheet of paper P. Here, when an amount of correction between the reference position Ps and the reference position Ps' is set so as to be $\alpha$, the amount of correction $\alpha$ is indicated as follows:

$$\alpha = Ps - Ps' = \Delta X_1 - \Delta X'$$

where $\Delta X'$ indicates a second amount of deviation detected by the second deviation detection portion when the reference position Ps of the edge of sheet of paper P shifts to the reference position Ps' of the edge of sheet of paper P. In this embodiment, the reference position Ps is corrected so that the deference between the image center Gc and the sheet center Pc is decreased.

Since the reference position Ps of the edge of sheet of paper P is set so as to shift to the reference position Ps' of the passing of sheet of paper P, the second deviation detection portion 12 detects the difference between the reference position Ps' and the passing position of the edge of sheet of paper P. Namely, it detects the second amount of deviation $\Delta X_2$ of the sheet of paper P as $\Delta X'$ (in other words, $\Delta X_2 = \Delta X'$). While the sheet of paper P is deviated to the right side like the one shown in FIG. 2, the second amount of deviation $\Delta X_2$ or the sheet of paper P is less than the first amount of deviation $\Delta X_1$ of the sheet of paper P. This enables a deviation to be corrected within the movable region of the pair or registration rollers 32. Additionally, the corrected sheet of paper P' is shown in FIG. 3 by the dotted line.

Figure 4:
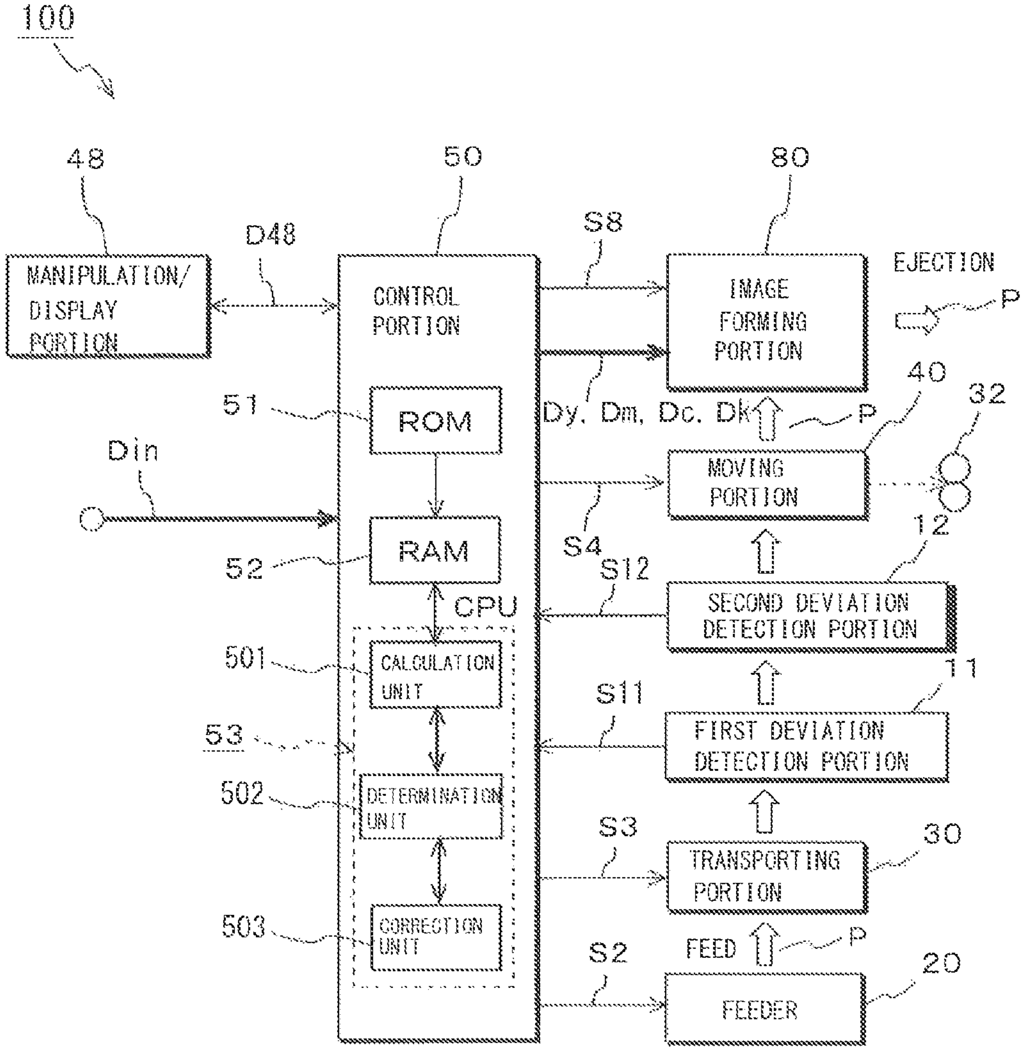
FIG. 4 is a block diagram of a control system in the color copier showing a configuration example.

The following will describe a configuration example of a control system of the color copier 100, which is an embodiment of the image forming apparatus, with reference to FIG. 4. As shown in FIG. 4, the control system of true color copier 100 contains the first deviation detection portion 11, the second deviation detection portion 12, the feeder 20, a transporting portion 30, a moving portion 40, a manipulation/display portion 48, the control portion 50 and the image forming portion 80.

The control portion 50 includes, for example, a read only memory (hereinafter, referred to as "ROM 51") to store control programs or the like, a random access memory (hereinafter, referred to as "RAM 52") to store data temporarily, a central processing unit (hereinafter, referred to as "CPU 53") and the like. The CPU 53 reads the control program out of the ROM 51 at the same time when the power is turned on to extract it on the RAM 52 so that the control system starts up. The CPU 53 controls operations of respective portions in the color copier 100.

The control portion 50 connects the manipulation/display portion 48. A user manipulates the manipulation/display portion 48 to select an image forming condition when forming the image or to select one feeding tray among the feeding trays 20A, 20B and 20C and the like in each of which sheets of paper P of any predetermined sixe are contained. The manipulation/display portion 48 outputs any information set therein as the manipulation data D48 to the control portion 50. The manipulation/display portion 48 is composed of a liquid crystal panel, a touch panel, numeric keyboard and the like.

The control portion 50 connects the feeder 20 and the transporting portion 30. The feeder 20 sends the sheets of paper P out of the feeding tray 20A or the like selected on the basis of a feeding control signal S2 through the pick-up rollers 22, the handling rollers 24 and the like (see FIG. 1). The control portion 50 outputs the feeding control signal 32 to the feeder 20.

The transporting portion 30 transports the sheets of paper P sent out of the feeder 20 to a predetermined position of the image forming portion 80 based on a transport control signal S3. In this embodiment, the transporting portion 30 transports the sheets of paper P to the pair of registration robbers 32 through the conveying rollers 26, the transfer rollers 28 and the like. The loop rollers 36 correct a deflection of the sheet of paper P transported to the pair of registration rollers 32 by hitting a forward edge of the sheet of paper P thereto (Registration Correction). The control portion 50 outputs the transport control signal 33 to the conveying portion 30.

The control portion 50 connects the first and second deviation detection portions 11, 12. The first deviation detection portion 11 detects the first amount of deviation $\Delta X_1$ of the sheet of paper P in relation to the reference position Ps of an edge of the sheet of paper P on a transporting route of the sheet of paper P fed from the PFU before the image is formed and generates a first deviation detection signal S11. The first deviation detection signal S11 is a signal indicating the first amount of deviation $\Delta X_1$ of the sheet of paper P in relation to the reference position Ps of the edge of the sheet of paper P. The first deviation detection portion 11 outputs the first deviation detection signal S11 to the control portion 50.

It is to be noted that when performing the duplex printing mode, the first deviation detection portion 11' detects the first amount of deviation $\Delta X_1$ of the sheet of paper P in relation to the reference position Ps of an edge of the sheet of paper P on the sheet reverse route of the sheet of paper transported from the fixing portion 44 to the sheet-reversing unit 60 before the image is formed on the rear surface of the sheet of paper P and generates the first deviation detection signal S11', not shown. The first deviation detection portion 11' outputs the first deviation detection signal S11' to the control portion 50.

The control portion 50 shifts an image writing position in the exposing portion 3Y or the like based on the detected first amount of deviation $\Delta X_1$ of the sheet of paper P along the direction that is perpendicular to the transporting direction of the sheet of paper P. In the above-mentioned control portion 50, the CPU 53 has any functions of a calculation unit 501, a determination unit 502 and a correction unit 503. For example, the calculation unit 501 calculates an amount of deviation $\Delta X_1$ which is a difference between the reference position Ps of the edge of the sheet of paper P and the passing position of the edge of the sheet of paper P based on the first deviation detection signal S11 (first amount-of-deviation detection information).

The determination unit 502 determinates whether or not the first amount of deviation $\Delta X_1$ of the sheet of paper P, which is detected by the first deviation detection portion 11, exists within the moving adjustment range of the pair of registration rollers 32 in the second control. The correction unit 503 performs the first control to correct the reference position Ps of the edge of the sheet of paper P before the image is formed when the first amount of deviation $\Delta X_1$ of the sheet of paper P exceeds the moving adjustment range of the pair of registration rollers 32.

The second deviation detection portion 12 detects the second amount of deviation of the sheet of paper P after the registration correction. For example, the second deviation detection portion 12 detects a second amount of deviation $\Delta X_2$ of the sheet of paper P just before the image is formed in relation to the reference position Ps' of the edge of the sheer of paper P corrected by the control portion 50 and generates a second deviation detection signal S12. The second deviation detection signal S12 is a signal indicating the second amount of deviation $\Delta X_2$ of the sheet of paper P in relation to the reference position Ps' of the edge of the sheet of paper P. The second deviation detection portion 12 outputs the second deviation detection signal 112 to the control portion 50.

In this embodiment, the control portion 50 detects the second amount of deviation $\Delta X_2$ of the sheet of paper P on which the registration correction has been performed and controls the moving portion 40 based on the second amount of deviation $\Delta X_2$ of the sheet of paper P. The moving portion 40 performs the second control to move the pair of registration rollers 32 along the direction that is perpendicular to the transporting direction of the sheet of paper P with the pair of registration rollers 32 nipping the sheet of paper P based on a moving control signal 54. This movement allows any deviation of the sheet of paper P to be corrected (registration fluctuation correction). The moving control signal S4 is a signal for allowing the pair of registration rollers 32 to be moved to the direction that is perpendicular to the transporting direction of the sheet of paper P. The control portion 50 outputs the moving control signal 54 to the moving portion 40.

The image forming portion 80 forms a color image based on an image forming signal S8 and items of image data Dy, Dm, Dc and Dk. The image forming signal S8 is a signal for controlling the photosensitive drums 1Y, 1M, 1C and 1K, the charging portions 2Y, 2M, 2C and 2K, the exposing portions 3Y, 3M, 3C and 3K and the developing portions 4Y, 4M, 4C and 4K, which correspond to each color. The items of image data Dy, Dm, Dc and Dk are data for forming the color image. The control portion 50 outputs the image forming signal S8 and the items of image Dy, Dm, Dc and Dk to the image forming potion 80. Thus, the control system of the color copier 100 is configured.

<First Embodiment>

Figure 5:
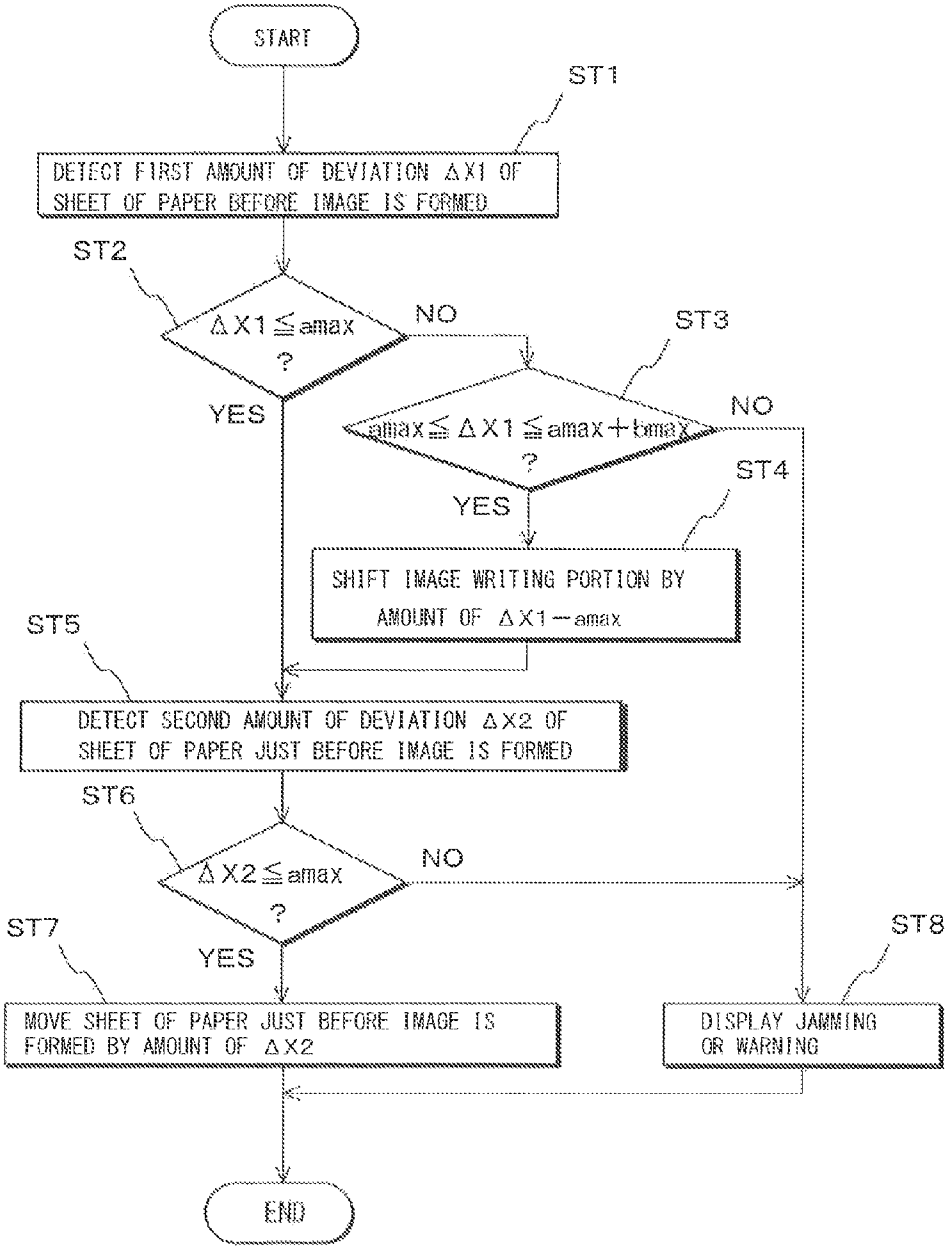
FIG. 5 is a flowchart showing a control example when correcting the deviation of the sheet of paper P as a first embodiment.

The following will describe a control example of the pair of registration rollers 32 when correcting the deviation of the sheet of paper P, as a first embodiment, with reference to FIG. 5. In the embodiment, when the first amount of deviation $\Delta X_1$ of the sheet of paper P exceeds the moving adjustment range of the pair of registration rollers 32 in the second control, the image writing position in the exposing portion 3Y or the like corresponding to an amount of deviation of the sheet of paper P by an amount exceeded from the moving adjustment range of the pair of registration rollers 32 in the first control is shifted along the direction that is perpendicular to the sheet-transporting direction of the sheet of paper P to correct the reference position Ps of the edge of the sheet of paper P. For example, the control portion 50 performs the first control to shift the image writing position in the exposing portion 3Y or the like corresponding to the amount of deviation of the sheet of paper P along the direction that is perpendicular to the transporting direction of the sheet of paper P to correct the reference position Ps of the edge of the sheet of paper P so that an amount of movement of the pair of registration rollers 32 in the second control exists within the moving adjustment range of the pair of registration rollers 32.

Under, these control conditions, as shown in FIG. 5, at a step ST1, after starting feeding the sheet of paper, the control portion 50 obtains the first deviation detection information for performing the first deviation detection determination. In this moment, the first deviation detection portion 11 detects the passing of the sheet of paper P at a predetermined position before the image is formed and generates the first deviation detection signal S11 indicating the first amount of deviation $\Delta X_1$ of the sheet of paper P in relation to the reference position Ps of the edge of the sheet of paper P. The first deviation detection signal S11 is output to the control portion 50. The control portion 50 performs analog to digital conversion on the first deviation detection signal S11 to form binarized data (first deviation detection information). The control portion 50 calculates the first amount of deviation $\Delta X_1$ of the sheet of paper P which is the difference between the reference position Ps of the edge of the sheet of paper P and the passing position of the edge of the sheet of paper P based on the first deviation detection information.

Next, at a step ST2, the control portion 30 compares the first amount of deviation $\Delta X_1$ of the sheet of paper P with the maximums value (hereinafter, referred to as "a max") of the movement of the pair of registration rollers 32 to determine whether or not it satisfies a condition of $\Delta X_1 \leq$a max (first deviation detection determination). This determination is used for determining whether or not the first deviation correction is allowed within the moving adjustment range (hereinafter, referred to as moving adjustment width "a") of the pair of registration rollers 32 in the moving portion 40. A criterion in this moment is whether or not the first amount of deviation $\Delta X_1$ of the sheet of paper P exists within the moving adjustment width "a" in the second control.

If it satisfies a condition of $\Delta X_1 \leq$a max, the control portion 50 goes to a step ST5 where the control portion 50 obtains the second deviation detection information for performing the second deviation detection determination. In this moment, the second deviation detection portion 12 detects the passing of the sheet of paper P at a predetermined position before the image is formed and generates the second deviation detection signal S12 indicating the second amount of deviation $\Delta X_2$ of the sheet of paper P in relation to the reference position Ps of the edge of the sheet of paper P which does not require any correction. The second deviation detection signal S12 is output to the control portion 50. The control portion 50 performs analog to digital conversion on the second deviation detection signal S12 to form binarized data (second deviation detection information). The control portion 50 calculates the second amount of deviation $\Delta X_2$ of the sheet of paper P which is the difference between the reference position Ps of the edge of the sheet of paper P and the passing position of the edge of the sheet of paper P based on the second deviation detection information. The second amount of elevation $\Delta X_2$ of the sheet of paper P is a required amount of movement $\Delta X_2$ of the sheet of paper P in relation to the reference position Ps of the edge of the sheet of paper P which does not require any correction.

If no new deviation occurs during an interval between the first deviation detection and the second deviation detection, the second deviation detection information has the same contents as those of the first deviation detection information (namely, the first amount of deviation $\Delta X_1$ of the sheet of paper P is the same as the required amount of movement $\Delta X_2$ of the sheet of paper P). In this embodiment, however, it is supposed that any new deviation occurs during the interval between the first deviation detection and the second deviation detection by means of the registration correction or the like. The required amount of movement of the sheet of paper P is thus noted as $\Delta X_2$.

Further, at a step ST6, the control portion 50 compares the required amount of movement $\Delta X_2$ of the sheet of paper P with the maximum value, a max, of the movement of the pair of registration rollers 32 to determine whether or not it satisfies a condition of $\Delta X_2 \leq$a max (second deviation detection determination). This determination is used for determining again whether or not the required amount of movement $\Delta X_2$ of the sheet of paper P is allowed within the moving adjustment width "a" of the pair of registration rollers 32 in the second control. If it satisfies a condition of $\Delta X_2 \leq$a max, the control portion 50 goes to a step ST7 where the control portion 50 controls the moving portion 40 to move the sheet of paper P based on the reference position Ps of the edge of the sheet of paper P which does not require any correction and the required amount of movement $\Delta X_2$ of the sheet of paper P just before the image is formed. The moving portion 40 drives the pair of registration rollers 32 to move the position or the sheet of paper P by an amount of $\Delta X_2$ so that the deviation of the sheet of paper P is decreased.

If it does not satisfy the condition of $\Delta X_1 \leq$a max in the above step ST2, namely, if it satisfies the condition of $\Delta X_1 >$a max, at a step ST3, the control portion 50 inputs "a max", "$\Delta X_1$" and "a max+b max" to determine whether or not it satisfies a condition of a max$\leq \Delta X_1 \leq$a max+b max (deviation correction ability judgment). Here, term, "b max" indicates the image writing maximum value of the image writing adjustment width "b" of the image writing position by the exposing portion 3Y or the like. This determination is used, for determining whether or not the control portion can perform the first control to correct the reference position Ps of the edge of the sheet of paper P before the image has been formed when the first amount of deviation $\Delta X_1$ of the sheet of paper P exceeds the moving adjustment range of the pair of registration rollers 32 in the second control.

If it satisfies the condition of a max$\leq \Delta X_1 \leq$a max+b max, the control portion 50 goes to a step ST4 where the control portion 50 shifts the image writing position in the exposing portion 3Y or the like by an amount of $\Delta X_1$−a max before the image has been formed. In this moment, the control portion performs the first control to correct the reference position Ps of the edge of the sheet of paper P. After the reference position Ps of the edge of the sheet of paper P is corrected, the control portion 50 goes to the step ST5 where the control portion 50 obtains the second deviation detection information for performing the second deviation detection determination.

In this moment, the second deviation detection portion 12 detects the passing of the sheet of paper P at a position just before the image has been formed and generates the second deviation detection signal S12 indicating the second amount of deviation $\Delta X_2$ of the sheet of paper P in relation to the reference position Ps' of the edge of the sheet of paper P which is corrected. The second deviation detection signal S12 is output to the control portion 50. The control portion 50 performs analog to digital conversion on the second deviation detection signal S12 to form second deviation detection information. The control portion 50 calculates the second amount of deviation $\Delta X_2$ (required amount of movement ΔX') of the sheet of paper P which is the difference between the reference position Ps' of the edge of the sheet of paper P which is corrected and the passed position of the edge of the sheet of paper P based on the second deviation detection information.

Thereafter, at the step ST6, the control portion 50 compares the required amount of movement $\Delta X_2$ of the sheet of paper P with the maximum value, a max, of the movement of the pair of registration rollers 32 to determine whether or not it satisfies a condition of $\Delta X_2 \leq$a max (deviation detection determination). If it satisfies a condition of $\Delta X_2 \leq$a max, the control portion 50 goes to a step ST7 where the control portion 50 controls the moving portion 40 to move the sheet of paper P based on the reference position Ps' of the edge of the sheet of paper P which is corrected and the required amount of movement $\Delta X_2$ of the sheet of paper P just before the image has been formed. The moving portion 40 drives the pair of registration rollers 32 to move the position of the edge of the sheet of paper P by an amount of $\Delta X_2$ so that the deviation of the sheet of paper P is decreased.

If it does not satisfy the condition of a max$\leq \Delta X_1 \leq$a max+b max in the above step ST3 and if it does not satisfy the condition of $\Delta X_2 \leq$a max in the above step ST6, namely, if it satisfies the condition of a max+b max$<\Delta X_1$, the control portion 50 performs any jam processing or any warning display processing at a step ST8. For example, a message, "Deviation of the sheet of paper exceeding deviation correction performance has occurred" is displayed on a screen of the manipulation/display portion 48.

Thus, according to the color copier 100 as the first embodiment of this invention and its control example when correcting the deviation of the sheet of paper, the control portion 50 performs the first control to correct the reference position Ps of the edge of the sheet of paper P to be detected by the second deviation detection portion 12 to the reference position Ps' of the edge of the sheet of paper P before the image is formed when the first amount of deviation $\Delta X_1$ of the sheet of paper P detected by the first deviation detection portion 11 exceeds the moving adjustment range of the pair of registration rollers 32 in the second control. Further, the control portion 50 controls the second deviation detection portion 12 to detect the second amount cut deviation $\Delta X_2$ of the sheet of paper P just before the image is formed in relation to the reference position Ps' or the edge of the sheet of paper P which is corrected. The control portion 50 also performs the second control to move the pair of registration rollers 32 based on the detected second amount or deviation $\Delta X_2$ of the sheet of paper P.

According to these configurations, even when the first amount of deviation $\Delta X_1$ of the sheet of paper P detected by it the first deviation detection portion 11 exceeds the moving adjustment range of the pair of registration rollers 32 in the second control, the second amount of deviation $\Delta X_2$ of the sheet of paper P in relation to the reference position Ps' of the edge of the sheet of paper P, which is corrected, is always included within the moving adjustment range of the pair of registration rollers 32 in the second control. Accordingly, it is possible to restrain the moving adjustment width of the pair of registration rollers 32 in the second control within the predetermined moving adjustment range of the pair of registration rollers 32. Further, since an image forming center does not move to the utmost, it is possible to prevent any variations from occurring in a moving amount of sheet of paper P before the image is formed. It is also possible to prevent any variation from occurring in a moving amount of the image formed sheet of paper along a sheet-width direction during sheet ejection.

<Second Embodiment>

Figure 6:
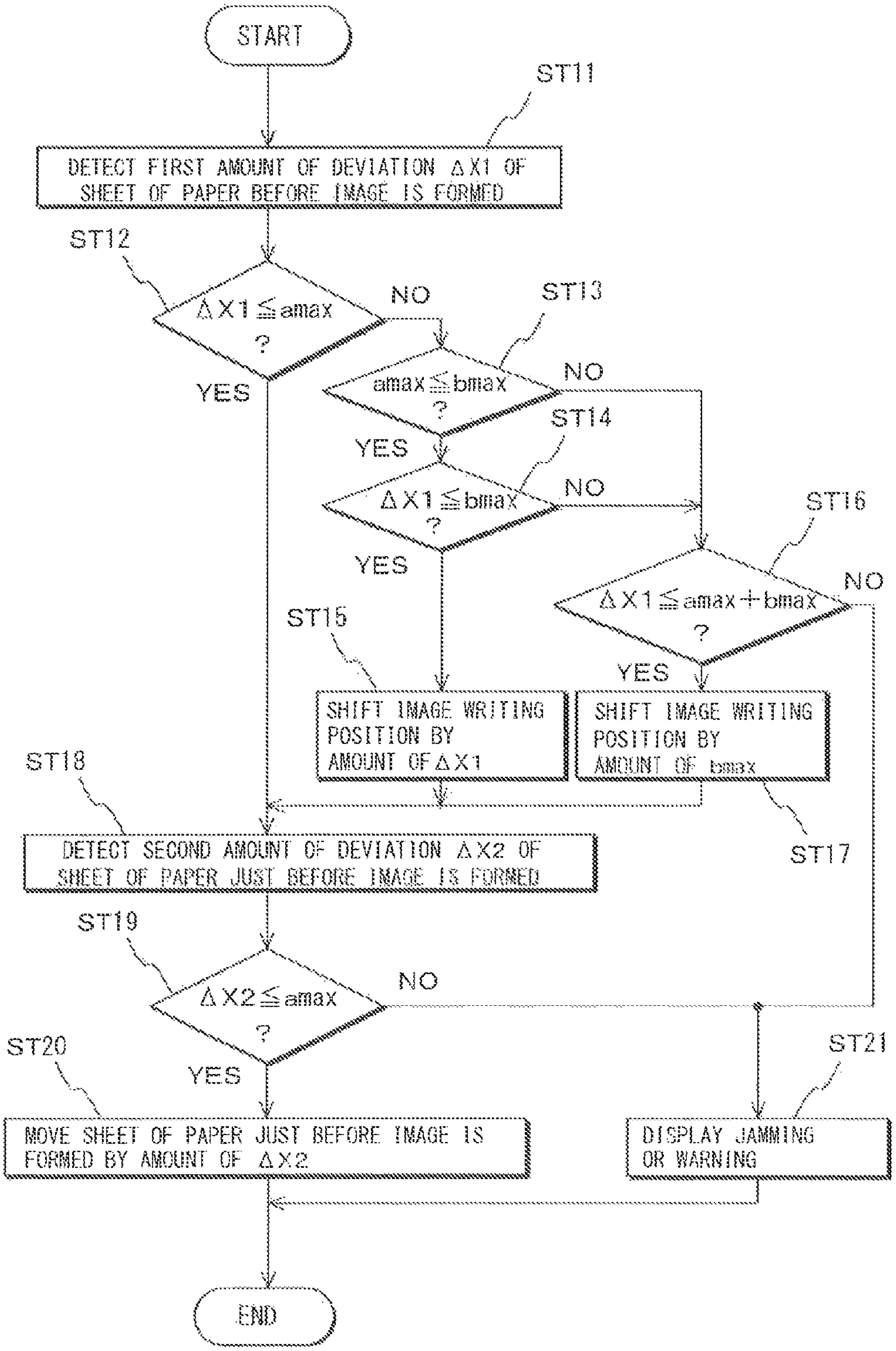
FIG. 6 is a flowchart showing a control example when correcting the deviation of the sheet of paper P as a second embodiment.

The following will describe a control example of the pair of registration rollers 32 when correcting the deviation of the sheet of paper P, as a second embodiment, with reference to FIG. 6. In the embodiment, the control portion 50 compares a maximum value (hereinafter, simply referred to as "a max") of movement of the pair of registration rollers 32 in the moving adjustment range thereof in the second control with a writing maximum value (hereinafter, simply referred to as "b max") of the writing position in a writing adjustment range thereof by the exposing portion 3Y or the like in the first control. The control portion 50 also shifts the image writing position by the exposing portion 3Y or the like corresponding to the first amount of deviation $\Delta X_1$ along the direction that is perpendicular to the transporting direction of the sheet of paper P to correct the reference position Ps of the edge of the sheet of paper P when the first amount of deviation $\Delta X_1$ detected by the first deviation detection portion 11 is the writing maximum value, b max, or less.

The control portion 50 further determines whether or not the first amount of deviation $\Delta X_1$ is a sum of "a max" and "b max" or less. The control portion 50 shifts the image writing position by the exposing portion 3Y or the like corresponding to "b max" along the direction that is perpendicular to the transporting direction of the sheet of paper P to correct the reference position Ps of the edge of the sheet of paper P when the first amount of deviation $\Delta X_1$ of the sheet of paper P is the sum of "a max" and "b max" or less.

Under these control conditions, as shown in FIG. 6, at steps ST11 and ST12, after starting feeding the sheet of paper, the control portion 50 performs the first deviation detection determination. The first deviation detection determination is the same as that of the first embodiment so that its description will be omitted. At the step ST12, if it does not satisfy a condition of $\Delta X_1 \leq$a max, the control portion 50 goes to a step ST13 where the control portion 50 compares "a max" with "b max" to determine whether or not it satisfies a condition of a max≤b max (correction ability determination).

If it satisfies a condition of a max≤b max, at a step ST14, the control portion 50 compares the first amount of deviation $\Delta X_1$ with "b max" to determine whether or not it satisfies a condition of $\Delta X_1 \leq$b max (deviation correction ability determination in the first control). If it satisfies a condition of $\Delta X_1 \leq$b max, the control portion 50 goes to a step ST15 where the control portion 50 shifts the image writing position by the exposing portion 3Y or the like by an amount of $\Delta X_1$ along the direction that is perpendicular to the transporting direction of the sheet of paper P. The control portion 50 then goes to a step ST18.

If it does not satisfy the condition of a max≤b max at the step ST13, namely, if it satisfies a condition of a max>b max, and if it does not satisfy the condition of $\Delta X_1 \leq$b max, namely, if it satisfies a condition of $\Delta X_1>$b max, at a step ST16, the control portion 50 compares the first amount of deviation $\Delta X_1$ with "a max+b max" to determine whether or not it satisfies a condition of $\Delta X_1 \leq a$ max+b max (deviation correction addition ability determination). If it satisfies a condition of $\Delta X_1 \leq a$ max+b max, the control portion 50 ones to a step STY17 where the control portion 50 shifts the image writing position in the exposing portion 3Y or the like by an amount, of "b max" along the direction that is perpendicular to the transporting direction of the sheet of paper P. The control portion 50 then goes to the step ST18.

If it satisfies the condition of $\Delta X_1 \leq a$ max at the step ST12, the control portion 50 goes to the step ST18 where the control portion 50 performs the second deviation detection determination. The second deviation detection determination has been already described in the first embodiment so that its description including the description of the step ST20 will be omitted.

If it does not satisfy the condition of $\Delta X_1 \leq a$ max+b max in the above step ST18 and if it does not satisfy the condition of $\Delta X_2 \leq a$ max in the above step ST19, namely, if the first amount of deviation $\Delta X_1$ of the sheet of paper P exceeding the deviation correction ability or the second amount of deviation $\Delta X_2$ exceeding the maximum value of movement, a max, of the pair of registration rollers 32 is detected, the control portion 50 performs any jam processing or any warning display processing at a step ST21.

Thus, according to the color copier 100 as the second embodiment of the image forming apparatus of this invention and the control example of the pair of registration roller 32 when correcting the deviation of the sheet of paper P, it is possible to perform the deviation correction with preventing any jam from occurring even when the sheet of paper P is greatly deviated over the moving adjustment range of the pair of registration rollers 32.

<Third Embodiment>

Figure 7:
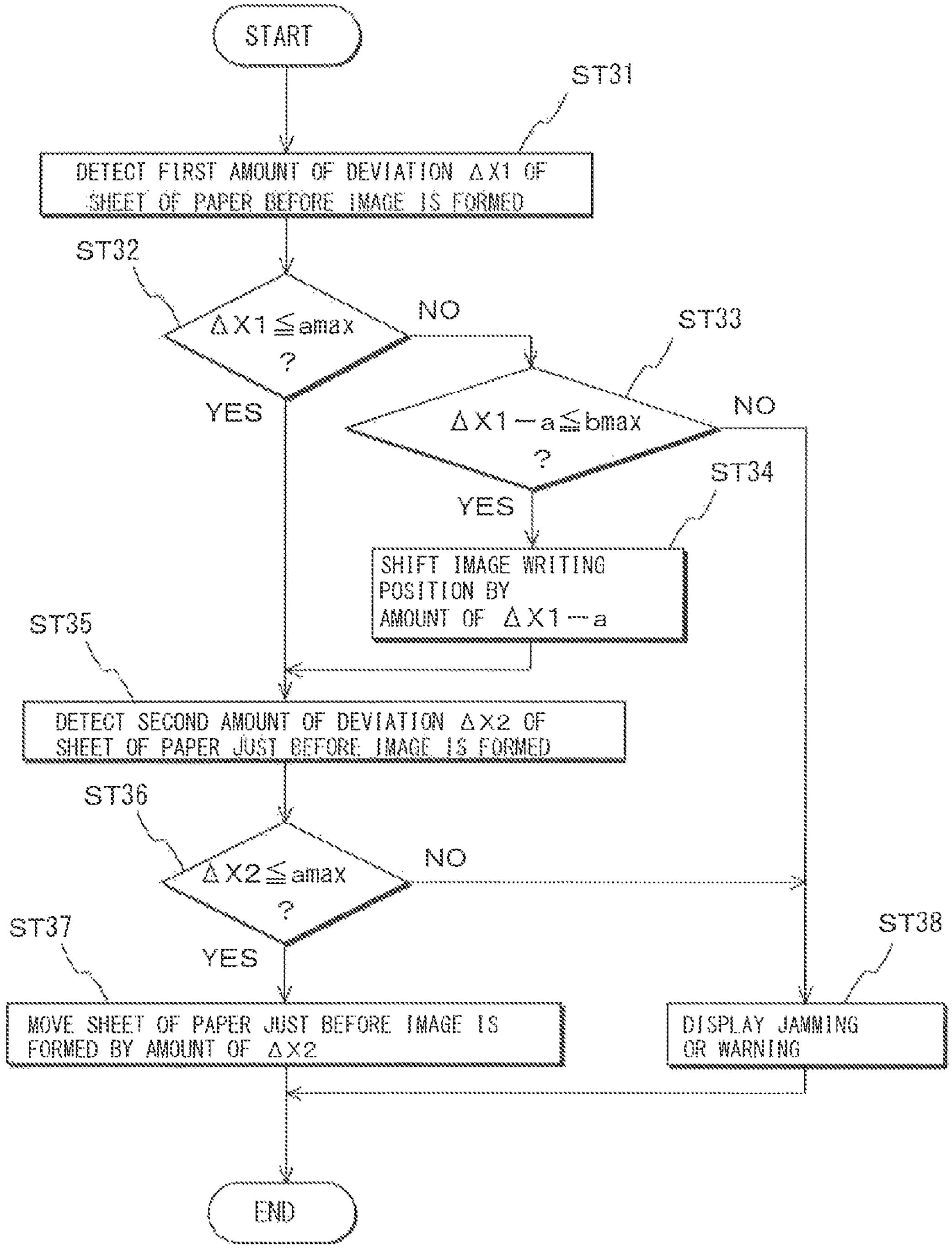
FIG. 7 is a flowchart showing a control example when correcting the deviation of the sheer, of paper P as a third embodiment.

The following will describe a control example of the pair of registration rollers 32 when correcting the deviation of the sheet of paper P, as a third embodiment, with reference to FIG. 7. In the embodiment, the control portion 50 calculates a difference between the first amount of deviation $\Delta X_1$ of the sheet of paper P, which is obtained by the first deviation detection portion 11, and the moving adjustment width "a" of the pair of registration rollers 32 in the second control to obtain a first difference $\Delta X_1-a$. The control portion 50 compares the obtained first difference $\Delta X_1-a$ with the writing maximum value, b max, of the writing position by the exposing portion 3Y or the like in the writing adjustment range thereof in the first control. The control portion then shifts the image writing position by the exposing portion 3Y or the like corresponding to the first difference $\Delta X_1-a$ along the direction that is perpendicular to the transporting direction of the sheet of paper P to correct, the reference position Ps of the edge of the sheet of paper P when the first difference $\Delta X_1-a$ is the writing maximum value, b max, or less.

Under these control conditions, as shown in FIG. 7, at steps ST31 and ST32, after starting feeding the sheet of paper, the control portion 50 performs the first deviation detection determination. The first deviation detection determination is the same as those of the first and second embodiments so that its description will be omitted. At the step ST32, if it does not satisfy a condition of $\Delta X_1 \leq a$ max, the control portion 50 goes to a step ST33 where the control portion 50 compares "$\Delta X_1-a$" with "b max" to determine whether or not it satisfies a condition of $\Delta X_1-a \leq b$ max (deviation correction ability determination).

If it satisfies a condition of $\Delta X_1-a \leq b$ max, at a step ST34, the control portion 50 shifts the image writing position by the exposing portion 3Y or the like by an amount of $\Delta X_1-a$ along the direction that is perpendicular to the transporting direction of the sheet of paper P. The control portion 50 then goes to a step ST35 where the control portion 50 performs the second deviation detection determination. The second deviation detection determination has been already described in the first and second embodiments so that its description including description of a step ST37 will be omitted.

If it does not satisfy the condition of $\Delta X_1-a \leq b$ max at the step ST33 and if it does not satisfy the condition of $\Delta X_2 \leq a$, namely, if the first amount of deviation $\Delta X_1$ of the sheet or paper P exceeding the deviation correction ability or the second amount of deviation $\Delta X_2$ exceeding the maximum value of movement, a max, of the pair of registration rollers 32 is detected, the control portion 50 performs any jam processing or any warning display processing at a step ST38. The warning display processing is the same as those of the first and second embodiments so that its description will be omitted.

Thus, according to the color copier 100 as the third embodiment of the image forming apparatus of this invention and the control example of the pair of registration rollers 32 when correcting the deviation of the sheet of paper P, the pair of registration rollers 32 can be moved to the same extent every time. Accordingly, it is possible to restrain from occurring any variation caused by friction between the sheet of paper P and a guide plate or the movement by inertia of the moving portion 40 based on a fact that the movements of the pair of registration rollers 32 are different every time.

<Fourth Embodiment>

Figure 8:
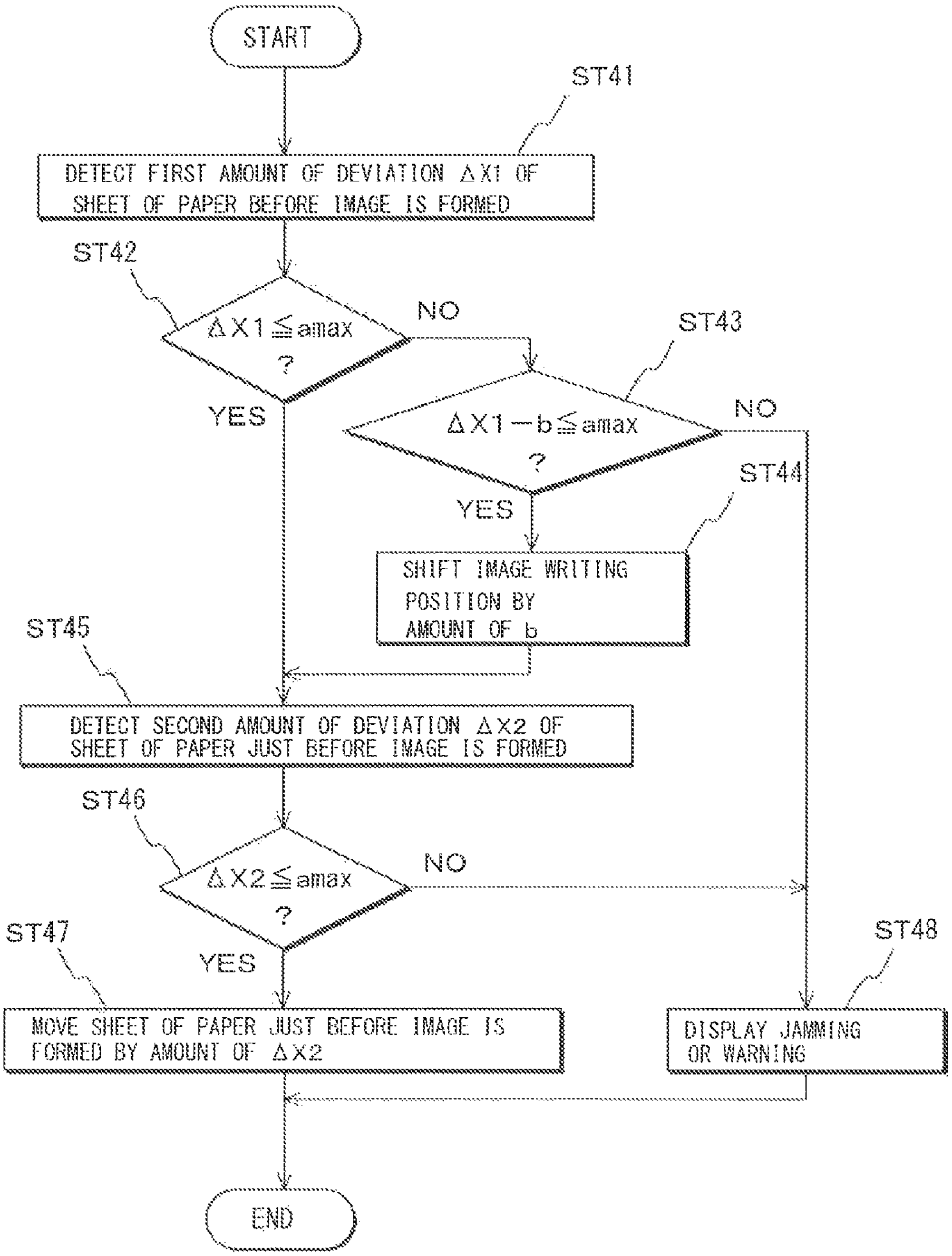
FIG. 8 is a flowchart showing a control example when correcting the deviation of the sheet of paper P as a fourth embodiment.

The following will describe a control example of the pair of registration rollers 32 when correcting the deviation of the sheet of paper P, as a fourth embodiment, with reference to FIG. 8. In the embodiment, the control portion 50 calculate a difference between the first amount of deviation $\Delta X_1$ of the sheet of paper P, which is obtained by the first deviation detection portion 11, and the writing adjustment width b of the image writing position in the writing adjustment region by the exposing portion 3Y or the like in the first, control to obtain a second difference $\Delta X_1-b$. The control portion 50 compares the obtained second difference $\Delta X_1-b$ with the maximum value of movement, a max, of the pair of registration rollers 32 in the moving adjustment, range thereof in the second control. The control portion 50 then shifts the image writing position corresponding to the writing adjustment width b along the direction that is perpendicular to the transporting direction of the sheet of paper P to correct, the reference position Ps of the edge of the sheet of paper P when the second difference $\Delta X_1-b$ is the maximum value of movement, a max, or less.

Under these control conditions, as shown in FIG. 8, at steps ST41 and ST42, after starting feeding the sheet of paper, the control portion 50 performs the first deviation detection determination. The first deviation detection determination is the same as those of the first through third embodiments so that its description will be omitted. At the step ST42, if it does not satisfy a condition of $\Delta X_1 \leq a$ max, the control portion 50 goes to a step ST43 where the control portion 50 compares the second difference, $\Delta X_1-b$, with the maximum value of movement, a max, to determine whether or not it satisfies a condition of $\Delta X_1-b \leq a$ max (deviation detection determination).

If it satisfies a condition of $\Delta X_1-b \leq a$ max, at a step ST44, the control portion 50 shifts the image writing position by the exposing portion 3Y or the like by an amount of the writing adjustment width "b" along the direction that is perpendicular to the transporting direction of the sheet of paper P. The control portion 50 then goes to a step ST45 where the control portion 50 performs the second deviation detection determination. The second deviation detection determination has been already described in the first through third embodiments so that its description including description of a step ST47 will be omitted.

If it does not satisfy the condition of condition of $\Delta X_1 - b \le a$ max at the above step ST43 and if it does not satisfy the condition of $\Delta X_2 \le a$ max at the step ST46, namely, if the first amount of deviation $\Delta X_1$ of the sheet of paper P exceeding the deviation correction ability or tins second amount of deviation $\Delta X_2$ exceeding the maximum value of movement, a max, of the pair of registration rollers 32 is detected, the control portion 50 performs any jam processing or any warning display processing at a step ST48. The warning display processing is the same as those of the first through third embodiments so that its description will be omitted.

Thus, according to the color copier 100 as the fourth embodiment of the image forming apparatus of this invention and the control example of the pair of registration rollers 32 when correcting the deviation of the sheet of paper P, if it satisfies the condition of $\Delta X_1 - b \le a$ max, at the step ST44, the control portion 50 shifts the image writing position by the exposing portion 3Y or the like by an amount of the writing adjustment width "b" along the direction that is perpendicular to the transporting direction of the sheet of paper P. As a result thereof, even when the sheet of paper P is deviated over the moving adjustment region, the image center position is shifted to the same extent so that it is possible to prevent any variation in the moving amount of the image formed sheet of paper P along a sheet-width direction during sheet ejection from occurring.

<Fifth Embodiment>

Figure 9:
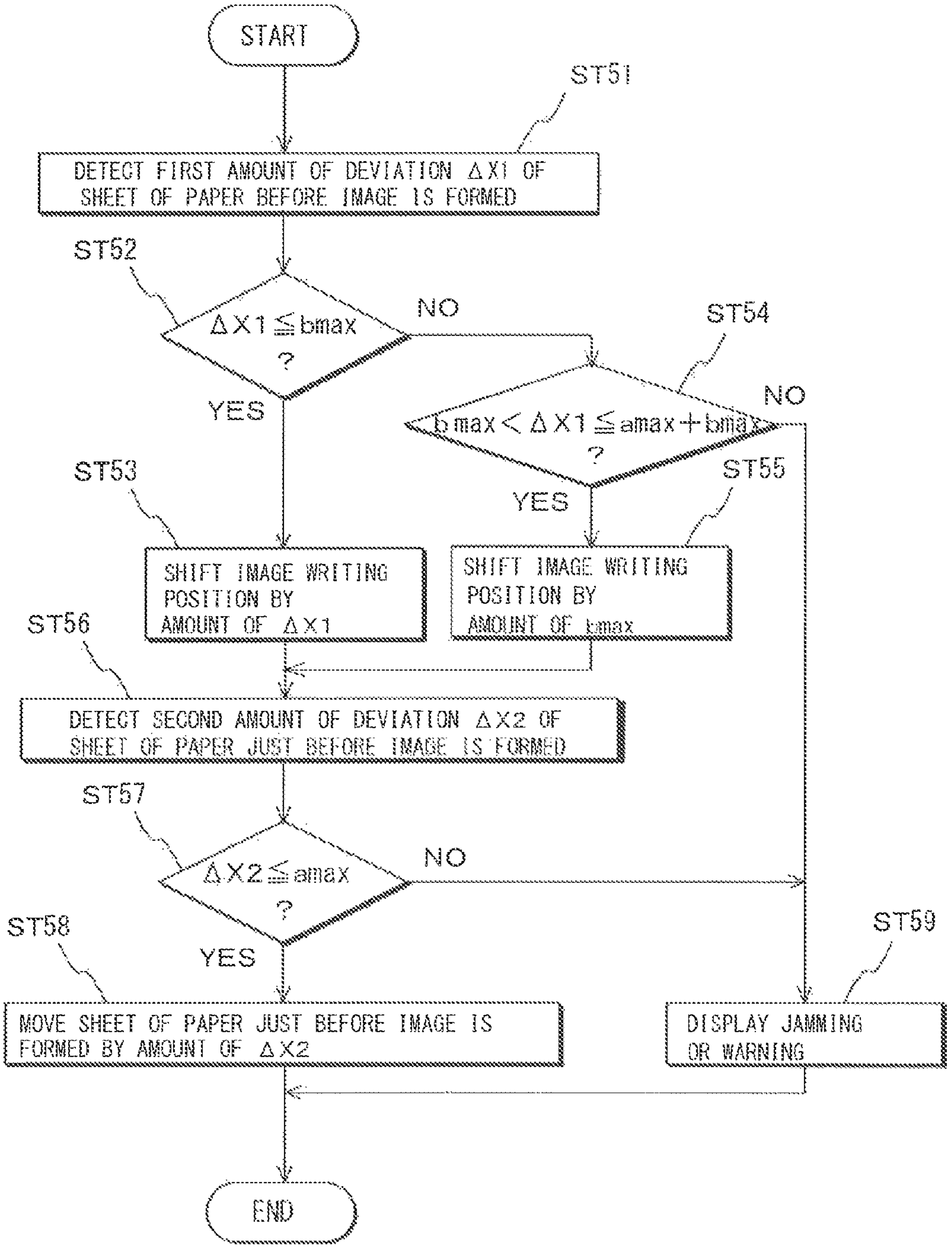
FIG. 9 is a flowchart showing a control example when correcting the deviation of the sheet of paper P as a fifth embodiment.

The following will describe a control example of the pair of registration rollers 32 when correcting the deviation of the sheet of paper P, as a fifth embodiment, with reference to FIG. 9. In the embodiment, the control portion 50 performs the first control before the image in formed, when the first amount of deviation $\Delta X_1$ of the sheet of paper P does not exceed the writing adjustment range of the image writing position by the exposing portion 3Y or the like, to shift the image writing position by the exposing portion 3Y or the like corresponding to the first amount of deviation $\Delta X_1$ of the sheet of paper P along the direction that is perpendicular to the transporting direction of the sheet of paper P and to correct the reference position Ps of tree edge of the sheet of paper P.

When the first amount of deviation $\Delta X_1$ of the sheet of paper P exceeds the writing adjustment range of the image writing position by the exposing portion 3Y or the like, the control portion 50 determines, before the image is formed, whether or not the first amount of deviation $\Delta X_1$ of the sheet of paper P exceeds the writing adjustment range of the image writing position by the exposing portion 3Y or the like and the first amount of deviation $\Delta X_1$ of the sheet of paper P exists within a range between the writing maximum value, b max, of the image writing adjustment region by the exposing portion 3Y or the like and the sum of the maximum value of movement, a max, of the pair of registration rollers 32 and the writing maximum value b max, of the image writing adjustment region by the exposing portion 3Y or the like. The control portion 50 shifts the image writing position by the exposing portion 3Y or the like corresponding to the writing maximum value, b max, based on the determination result along the direction that is perpendicular to the transporting direction of the sheet of paper P to correct the reference position Ps of the edge of the sheet of paper P.

Under these control conditions, as shown in FIG. 9, at a step ST51, after starting feeding the sheet of paper, the control portion 50 obtains the first deviation detection information for performing the first deviation detection determination. The method of calculating the first, amount of deviation $\Delta X_1$ (required amount of movement) of the sheet of paper P is the same as those of the first, through fourth embodiments so that its description will be omitted.

Next, at a step ST52, the control portion 50 compares the first amount of deviation $\Delta X_1$ of the sheet of paper P with the writing maximum value, b max, of the image writing adjustment region by the exposing portion 3Y or the like to determine whether or not it satisfies a condition of $\Delta X_1 \le b$ max (deviation detection determination). This determination is used for determine whether or not the deviation correction can be performed within the writing adjustment region (writing adjustment width b) on image information. The determination criterion in this case is whether or not the first amount of deviation $\Delta X_1$ of the sheet of paper P exists within a region of the writing maximum value, b max, in the first control.

If it satisfies a condition of $\Delta X_1 \le b$ max, at a step ST53, fine control portion 50 shifts the image writing position by the exposing portion 3Y or the like by an amount of the first amount of deviation $\Delta X_1$ of the sheet of paper P. Accordingly, it is possible to deal with the direction correction of the sheet of paper P based on the record deviation detection when the sheet of paper P is further deviated one a course from the first deviation detection portion 11 to the second deviation detection portion 12. The control portion 50 then goes to a step ST56. If it does not satisfy the condition of $\Delta X_1 \le b$ max, at a step ST54, the control portion 50 receives the writing maximum value, b max, the first amount of deviation $\Delta X_1$ of the sheet of paper P and the sum of "a max+b max" to determine whether or not it satisfies a condition of b max$<\Delta X_1 \le a$ max+b max (deviation correction ability determination).

If it satisfies a condition of b max$<\Delta X_1 \le a$ max+b max, at a step ST55, the control portion 50 shifts the image writing position by the exposing portion 3Y or the like by an amount of the writing maximum value, b max. The control portion 50 then goes to a step ST56 where the control portion 50 performs the second deviation detection determination. The second deviation detection determination has been already described, in the first through fourth embodiments so that its description including description of steps ST57 and ST58 will be omitted.

If it does not satisfy the condition of b max$<\Delta X_1 \le a$ max+b max at the above step ST54 and if it does not satisfy the condition of $\Delta X_2 \le a$ max at the step ST57, namely, if the first amount of deviation $\Delta X_1$ of the sheet of paper P exceeding the deviation correction ability or the second amount of deviation $\Delta X_2$ exceeding the maximum value of movement, a max, of the pair of registration rollers 32 is detected, the control portion 50 performs any jam processing or any warning display processing at a step ST59. The warning display processing is the same as those of the first through fourth embodiments so that its description will be omitted.

Thus, according to the color copier 100 as the fifth embodiment of the image forming apparatus of this invention and the control example of the pair of registration rollers 32 when correcting the deviation of the sheet of paper P, if it satisfies the condition of $\Delta X_1 \le b$ max, at the step ST53, the control portion 50 shifts the image writing position by the exposing portion 3Y or the like by an amount of the first amount, of deviation $\Delta X_1$ of the sheet of paper P. If it does not satisfy the condition of $\Delta X_1 \le b$ max, at the step ST54, the control portion 50 determines whether or not it satisfies the condition of b max$<\Delta X_1 \le a$ max+b max. If it satisfies the condition of b max$<\Delta X_1 \le a$ max+b max, at a step ST55, the control portion 3Y shifts the image writing position by the exposing portion 3Y or the like by an amount of the writing maximum value, b max.

Even when the sheet of paper P is further deviated on a course from the first deviation detection portion 11 to the second deviation detection portion 12, siren a configuration prevents a situation where the pair of registration rollers 32 exceeds their moving adjustment region from occurring in the deviation correction of the sheet of paper P based on the second deviation detection.

What is claimed is:

1. An image forming apparatus for forming an image on a sheet of paper, the apparatus comprising:

a first deviation detection portion that detects a first amount of deviation of the sheet of paper in relation to a reference position of an edge of the sheet of paper;

a pair of registration rollers that transport the sheet of paper, the pair of registration rollers being positioned at a downstream side of the first deviation detection portion;

a second deviation detection portion that detects a second amount of deviation of the sheet of paper in relation to the references position of the edge of the sheet of paper, the second deviation detection portion being positioned at free downstream side of the pair of registration rollers;

an image forming portion that receives the sheet of paper transported by the pair of registration rollers to form the image, and includes an exposing portion for writing the image, the image forming portion being positioned at the downstream side of the second deviation detection portion; and a control portion that is configured to perform a first control to correct an image writing position in the exposing portion based on the first amount of deviation of the sheet of paper along a direction that is perpendicular to a transporting direction of the sheet of paper and is configured to perform a second control to move the pair of the registration rollers with them nipping the sheet of paper based on the second amount of deviation of the sheet of paper along the direction that is perpendicular to the transporting direction of the sheet of paper, wherein the control portion determines whether or not the first amount of deviation of the sheet of paper exists within the moving adjustment range of the pair of registration rollers in the second control, the control portion performs the first control to correct the reference position of the edge of the sheet of paper to be detected by the second deviation detection portion when the first amount of deviation of the sheet of paper exceeds the moving adjustment range of the pair of registration rollers, the control portion controls the second deviation detection portion to detect the second amount of deviation of the sheet of paper in relation to the reference position corrected by the first control, and the control portion performs the second control to move the pair of registration rollers based on the detected second amount of deviation of the sheet of paper.

2. The image forming apparatus according to claim 1 wherein the control portion performs the first control, when the first amount of deviation of the sheet of paper exceeds the moving adjustment range of the pair of registration rollers in the second control, to shift the image writing position corresponding to the first amount of deviation by an amount exceeded from the moving adjustment range to correct the reference position.

3. The image forming apparatus according to claim 2 wherein the control portion performs the first control to shift the image writing position along the direction that is perpendicular to the transporting direction of the sheet of paper based on the first amount of deviation to correct the reference position so that an amount of movement of the pair of registration rollers in the second control exists within the moving adjustment range thereof.

4. The image forming apparatus according to claim 3 wherein the control portion compares a maximum value of movement of the pair of registration rollers in the moving adjustment range thereof in the second control with a writing maximum value of the writing position in a writing adjustment range thereof in the first control;

the control portion is configured to shift rise image writing position corresponding to the first amount of deviation along the direction that is perpendicular to the transporting direction of the street of paper to correct the reference position when the first amount of deviation is the writing maximum value or less;

the control portion determines whether or not the first amount of deviation is a sum of the maximum value of movement and the writing maximum value or less; and the control portion is configured to shift the image writing position corresponding to the writing maximum value along the direction that is perpendicular to the transporting direction of the sheet of paper to correct the reference position when the first amount of deviation is the sum of the maximum value of movement and the writing maximum value or less.

5. The image forming apparatus according to claim 4 wherein the control portion is configured to calculate a difference between the first amount of deviation which is obtained by the first deviation detection portion and the maximum value of movement of the pair of registration rollers in the second control to obtain a first difference;

the control portion compares the obtained first difference with the writing maximum value of the writing position in the writing adjustment range thereof in the first control; and the control portion is configured to shift the image writing position corresponding to the first difference along the direction that is perpendicular to the transporting direction of the sheet of paper to correct the reference position when the first difference is the writing maximum value or less.

6. The image forming apparatus according to claim 4 wherein the control portion is configured to calculate a difference between the first amount of deviation and the writing maximum value of the image writing position in the writing adjustment region in the first control to obtain a second difference;

the control portion compares the obtained second difference with the maximum value of movement of the pair of registration rollers in the moving adjustment range thereof in the second control; and the control portion is configured to shift the image writing position corresponding to the writing maximum value along the direction that as perpendicular to the transporting direction of the sheet of paper to correct the reference position when the second difference is the maximum value of movement or less.

7. The image forming apparatus according to claim 1 wherein the control portion performs the first control before the image is formed, when the first amount of deviation of the sheet does not exceed the writing adjustment range of the image writing position, to shift the image writing position corresponding to the first amount of deviation along the direction that is perpendicular to the transporting direction of the sheet of paper and to correct the reference position.

8. The image forming apparatus according to claim 7 wherein when the first amount of deviation of the sheet of paper exceeds the writing adjustment range of the image writing position, the control portion determines, before the image is formed, whether or not the first amount of deviation of the sheet of paper exceeds the writing adjustment range of the image writing position and the first amount of deviation of the sheet of paper exists within a range between the writing maximum value said the sum of the maximum value of movement of the pair of registration rollers and the writing maximum value; and the control portion is configured to shift the image writing position corresponding to the writing maximum value based on the determination result along the direction that is perpendicular to the transporting direction of the sheet of paper to correct the reference position.

* * * * *